United States Patent
Smith

(10) Patent No.: US 8,474,877 B2
(45) Date of Patent: Jul. 2, 2013

(54) PUSH-IN FITTING FOR ELECTRICAL METALLIC TUBING WITH ENHANCED SEALING AND CONTINUITY

(75) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 187 days.

(21) Appl. No.: 12/883,345

(22) Filed: Sep. 16, 2010

(65) Prior Publication Data

US 2011/0309611 A1 Dec. 22, 2011

Related U.S. Application Data

(63) Continuation-in-part of application No. 11/901,797, filed on Sep. 19, 2007, now Pat. No. 7,841,630.

(51) Int. Cl.
*F16L 11/118* (2006.01)

(52) U.S. Cl.
USPC ........................ 285/154.1; 285/305

(58) Field of Classification Search
USPC ............... 285/340, 149.1, 151.1, 154.1, 386, 285/305, 307
See application file for complete search history.

(56) References Cited

U.S. PATENT DOCUMENTS

| | | | |
|---|---|---|---|
| 1,809,582 A | 6/1931 | Church | 285/340 |
| 1,822,056 A | 9/1931 | Noble | 285/340 |
| 2,255,673 A | 9/1941 | Franklin | 285/382.7 |
| 2,448,888 A | 9/1948 | Hynes | 285/232 |
| 2,651,529 A * | 9/1953 | Wayman | 285/151.1 |
| 3,995,897 A | 12/1976 | Paskert | 285/340 |
| 4,073,514 A | 2/1978 | Pate | 285/149.1 |
| 4,123,090 A | 10/1978 | Kotsakis et al. | |
| 4,181,329 A | 1/1980 | Helm | 285/3 |
| 4,288,113 A * | 9/1981 | Saulnier | 285/340 |
| 4,819,974 A | 4/1989 | Zeidler | 285/373 |
| 4,885,429 A | 12/1989 | Schnittker | 174/668 |
| 5,284,582 A | 2/1994 | Yang | |
| 5,695,224 A | 12/1997 | Grenier | |
| 6,334,634 B1 | 1/2002 | Osterkil | |
| 6,335,488 B1 | 1/2002 | Gretz | |
| 6,352,439 B1 | 3/2002 | Stark et al. | |
| 6,450,550 B1 | 9/2002 | Cornwell | |
| 6,464,266 B1 | 10/2002 | O'Neill et al. | |
| 6,517,124 B1 | 2/2003 | Le Quere | |
| 6,663,145 B1 | 12/2003 | Lyall, III et al. | |
| 6,670,553 B1 | 12/2003 | Gretz | 174/664 |
| 6,682,355 B1 | 1/2004 | Gretz | |
| 6,765,143 B2 | 7/2004 | Kiely | |
| 6,913,292 B2 | 7/2005 | Snyder, Sr. et al. | |
| 6,988,746 B2 | 1/2006 | Olson | 285/151.1 |
| 7,390,027 B2 | 6/2008 | Kiely | 285/151.1 |
| 2005/0194785 A1 | 9/2005 | Shemtov | 285/382.7 |

\* cited by examiner

*Primary Examiner* — Aaron Dunwoody

(74) *Attorney, Agent, or Firm* — Fattibene and Fattibene LLC; Paul A. Fattibene

(57) ABSTRACT

An electrical fitting in the form of a connector or coupler for connecting an electrical metallic tube or EMT to an electrical box or panel or to one another. A unidirectional locking device is disposed in an outermost chamber and an O-ring is disposed in an intermediate chamber. The unidirectional locking device has gripping tangs. The intermediate chamber and gripping tangs are sized so as to prevent the gripping tangs from contacting the O-ring. A contact shoulder is used on one end of the fitting to prevent excessive compression of a sealing washer. Internal longitudinal radially increasing ribs are formed in the fitting body improving continuity and support for the EMT. A tube support may also be provided to prohibit any undesirable bending movement of the EMT connected thereto.

15 Claims, 10 Drawing Sheets

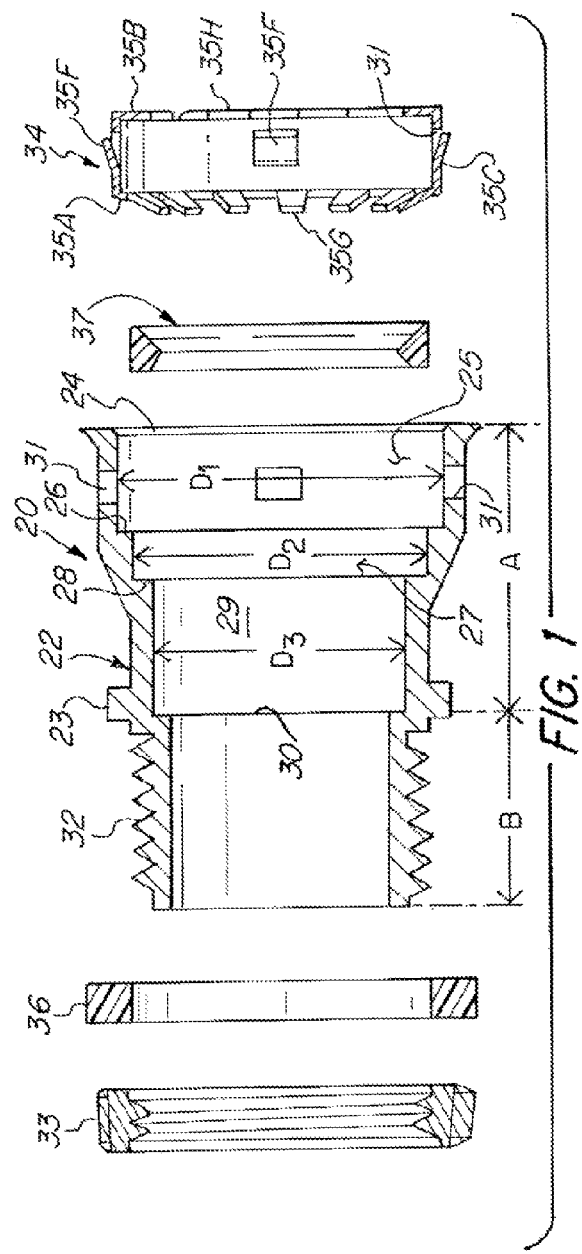
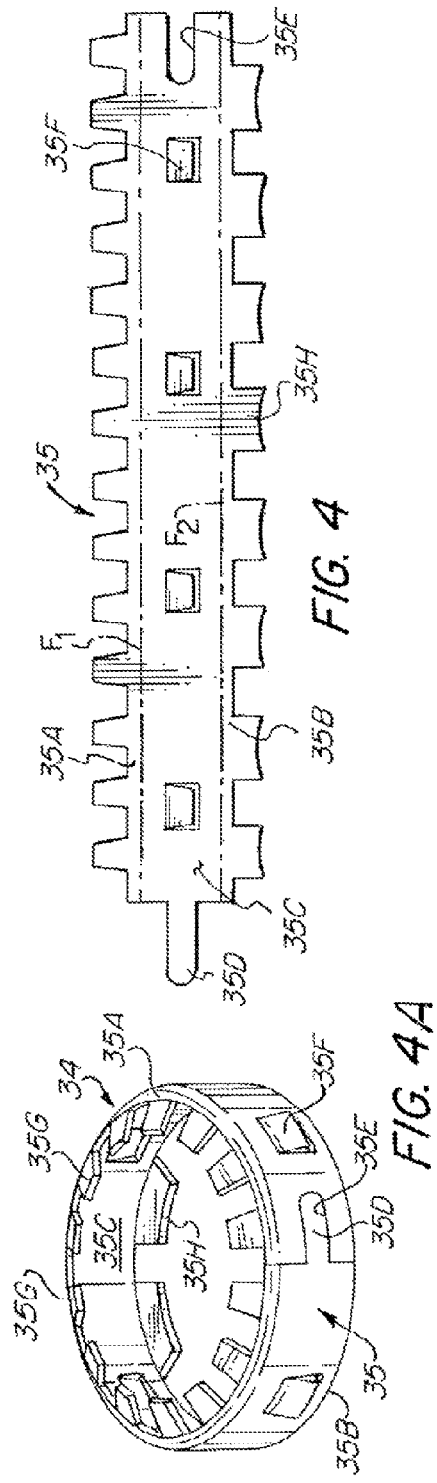
FIG. 1
FIG. 4
FIG. 4A

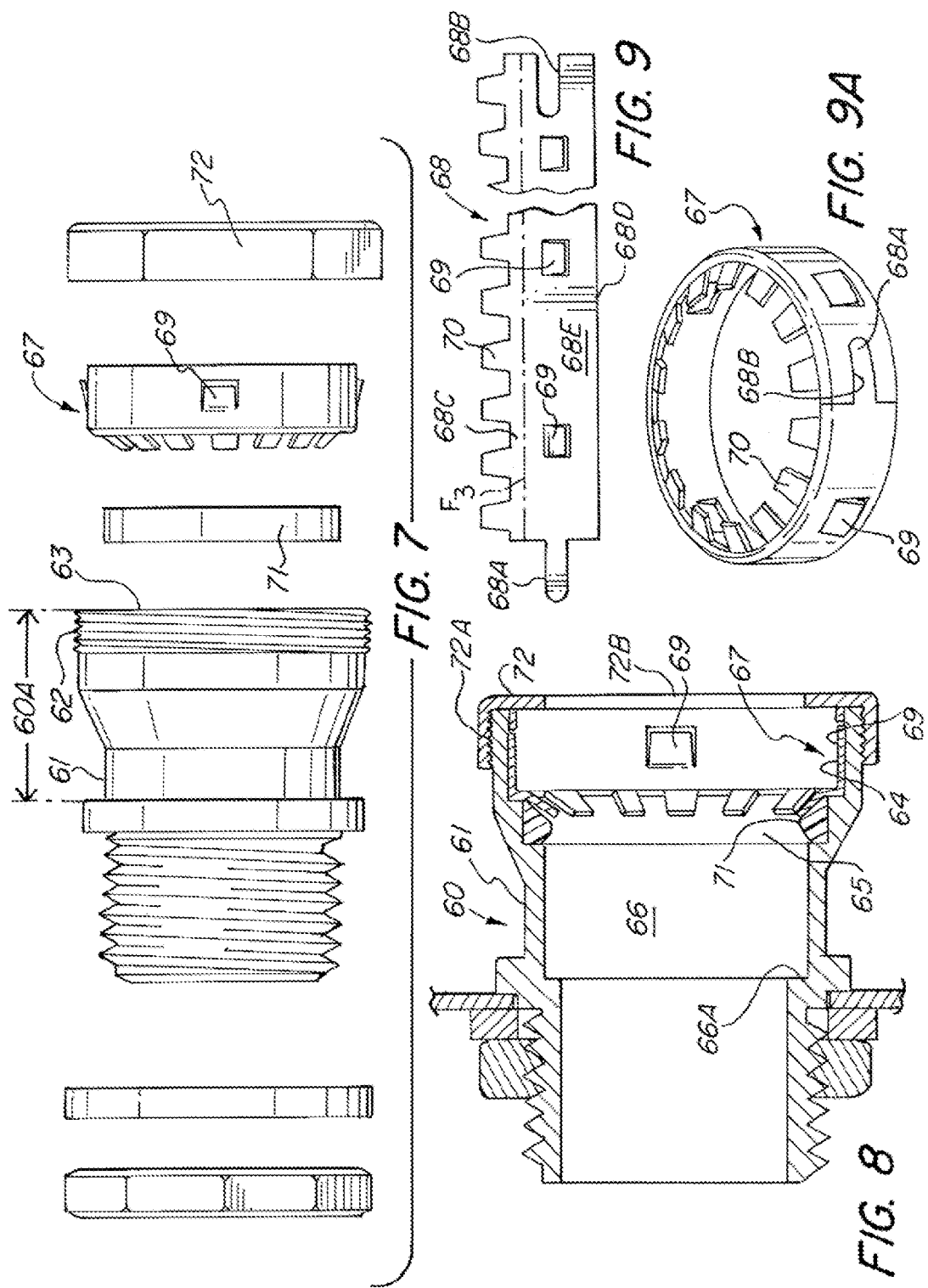

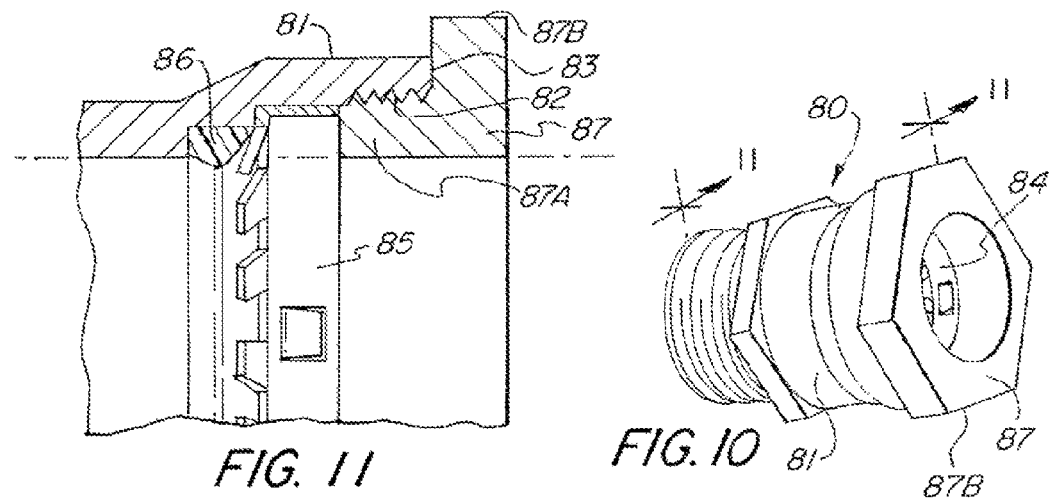
FIG. 11
FIG. 10
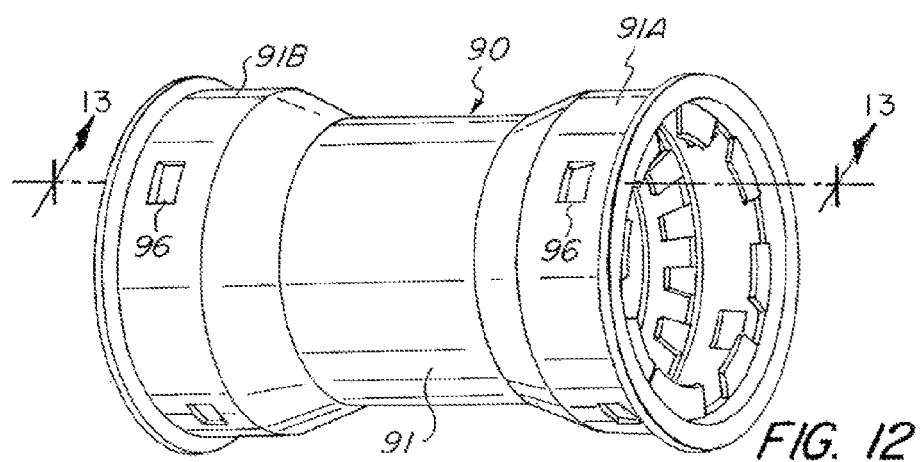
FIG. 12
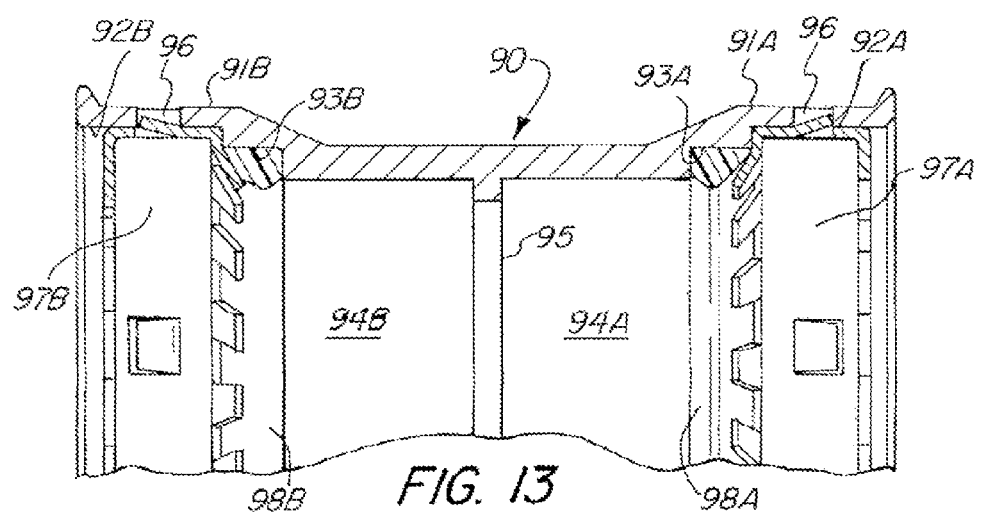
FIG. 13

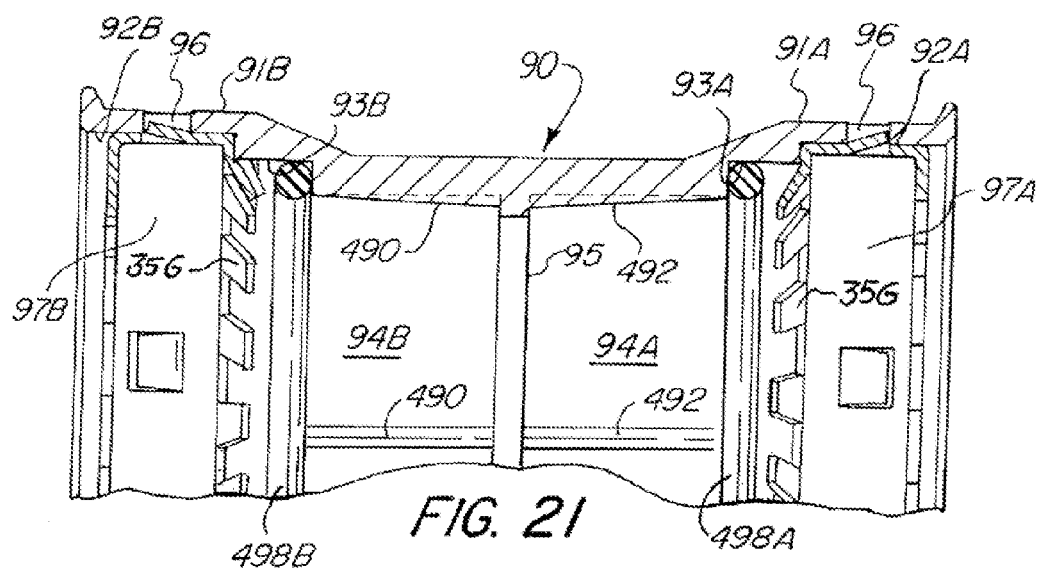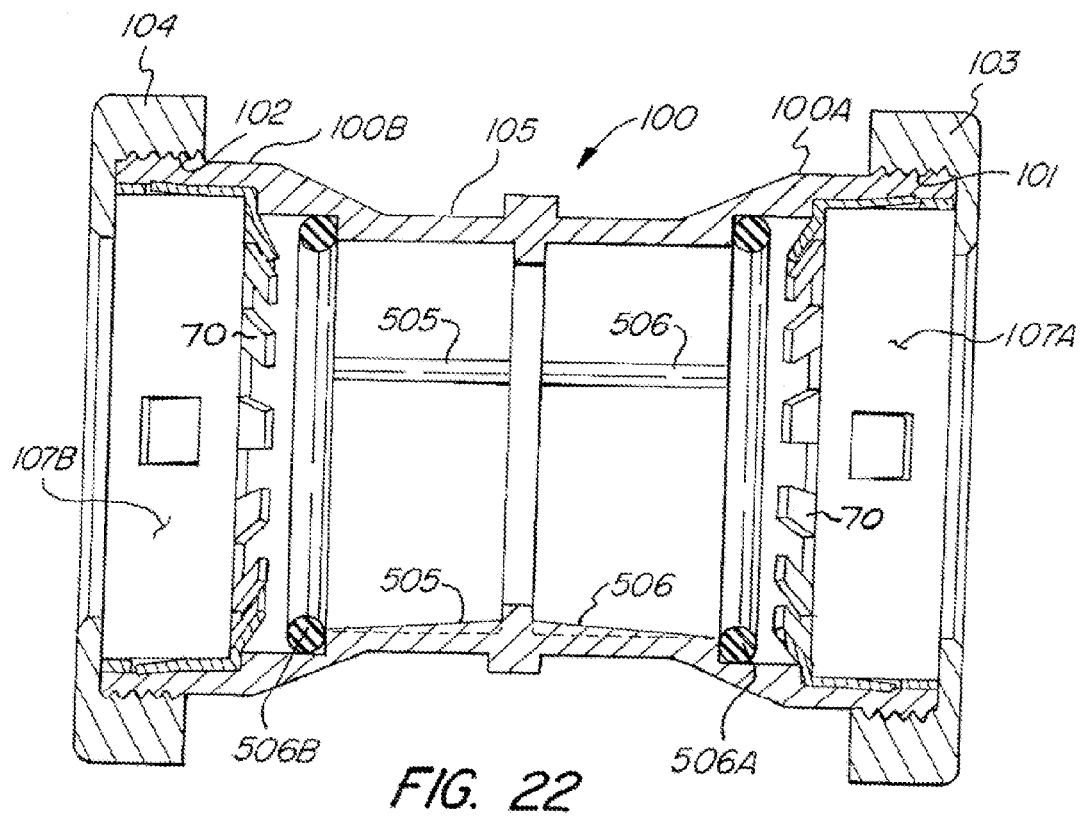

PUSH-IN FITTING FOR ELECTRICAL METALLIC TUBING WITH ENHANCED SEALING AND CONTINUITY

RELATED APPLICATION

This application is a continuation-in-part of application Ser. No. 11/901,797 filed Sep. 19, 2007 now U.S. Pat. No. 7,841,630.

FIELD OF THE INVENTION

This invention relates generally to electrical connectors or fittings for use with electrical metallic tubing or EMT, and more specifically to a "push-in" connector for attaching an electrical metallic tube to an electric box or panel or for connecting one electrical metallic tube to another electrical metallic tube.

BACKGROUND OF THE INVENTION

Various types of connectors or fittings for connecting tubes or conduits to a structure or to one another are known, as exemplified in U.S. Pat. Nos. 4,123,090; 5,284,582; 5,695,224; 6,334,634; 6,450,550; 6,464,266; 6,517,124; 6,663,145; 6,670,553; 6,765,143 and 6,913,292. Generally, the known connectors or fittings are relatively complex. Many consist of a relatively large number of component parts that require assembly which may not be cost effective and/or practical for their intended purpose. Further, some of the known connectors or fittings are not suitable for use with electrical metal conduits or tubes. Notwithstanding the extensive background relating to connectors or fittings for connecting tubular conduits, continuing efforts are being made to improve, simplify and/or to enhance the efficiency and/or use of such connectors or to simplify the assembly, cost and/or complexity of such known connectors or fittings in an effort to advance the connector art, and more specifically to advance the electrical tube connector art. The disclosure herein is directed to such efforts.

SUMMARY OF THE INVENTION

An object of this invention is to provide an electrical connector or fitting for connecting an electrical metallic tube or conduit thereto merely by pushing an end portion of an electrical metallic tube through the inlet opening of the electrical connector or fitting.

Another object is to provide an electrical connector or fitting incorporating a simple push-in locking arrangement for an electrical metallic tube adapted to connect such tube to an electric box or in the form of a coupler for joining two or more EMTs together.

Another object is to provide an electric connector or fitting having a unidirectional locking arrangement for securing an electrical metallic tube thereto whereby in one form of the invention, the electrical metallic tube can be rendered readily removable and in another form of the invention, removal of the electrical metallic tube is prohibited.

Another object of the invention is to provide an electrical connector or fitting having a simplified locking and sealing arrangement to which an electrical metallic tube or conduit may be positively secured thereto simply by pushing the end portion of an electrical metallic tube through the inlet opening of the connector or fitting.

Another object of this invention is to provide a locking device constructed and arranged to effect a positive unidirectional gripping force on an associated electrical metallic tube with an arrangement for retaining the locking device within the body of a connector to prohibit any unintentional separation thereof from the connector body.

Another object of the invention is to provide an electric connector or fitting having a locking device for securing an electrical metallic tube thereto by simply pushing an end portion of an electrical metallic tube through the locking device and which may be used with or without a water, liquid or moisture seal.

A feature of the invention resides in an electrical connector or fitting for securing an electrical metallic tube or conduit thereto which is relatively simple to manufacture, easy to assemble and positive in operation.

Another feature of this invention resides in a locking or gripping device formed from a blank of spring metal rolled into the form of a split ring having integrally formed circumferentially spaced depending gripping tangs and opposed integrally formed radially inward support tangs for supporting an electrical metallic tube adapted to be secured thereto.

It is yet another object of an embodiment of the invention to improve sealing.

It is yet another object of an embodiment of the invention to provide improved conductivity.

It is an advantage of the present invention that the shape of an O-ring seal is substantially maintained.

It is an advantage of an embodiment of the invention that a reduced voltage drop across the electrical connector is obtained.

It is a feature of the present invention that flexible gripping tangs are sufficiently spaced from the O-ring seal so as to prevent contact with the flexible gripping tangs.

It is a feature of an embodiment of the invention that the connector body has internal radially extending ribs that increase radially along an axial direction.

It is an object of an embodiment of the invention to improve weatherproof sealing when attaching the fitting to the electrical panel.

It is an advantage of an embodiment of the invention that a locknut may be securely tightened to the electrical panel without compromising the integrity of a sealing washer.

It is a feature of an embodiment of the invention that the flange has a contact shoulder adapted to contact an edge of the electrical panel preventing excessive compression of the sealing washer.

The foregoing objects, features, and advantages are attained by an electrical connector or fitting having a locking arrangement for enhancing the ease of connecting an electrical metallic tube to an electric box or panel or to connect one electrical metallic tube to another electrical metallic tube. The connector or fitting includes essentially a connector body having an inlet end portion and an outlet end portion with a bore extending therebetween. In one form of the invention, the inlet end portion defines an enlarged inlet forming an outermost chamber having a predetermined diameter for receiving a specifically constructed locking device, an intermediate chamber having a smaller diameter into which the locking tangs of the locking device may extend, and an innermost chamber having a lesser diameter sized for snugly receiving an end portion of a corresponding electrical metallic tube or conduit adapted to be fitted into the inlet end portion of the connector. The outermost chamber and intermediate chamber at their inner end are defined by shoulders and the inner end of the inner chamber being defined by an inwardly extending shoulder which functions as a stop to limit the distance the electrical metallic tube can be inserted thereinto.

The locking device is formed of a spring steel elongated blank which is rolled to define a split ring having a leading edge and a trailing edge that are inwardly bent relative to an intermediate planar portion therebetween. The readily inwardly bent leading edge of the locking device is provided with a series of circumscribing locking or gripping tangs that are inwardly and obliquely bent at approximately a 30° angle which are inclined or obliquely angled toward the intermediate chamber. The depending trailing edge of the locking device includes a series of support tangs arranged to define the inner periphery of the inlet opening of the connector body.

In one form of the invention, the intermediate planar portion of the locking device is provided with one or more holding tangs blanked or cut out of the plane of the intermediate planar portion that are outwardly bent and arranged to be received in a corresponding tang opening formed in the connector body adjacent the inlet opening in a manner to prohibit any pull-out of the locking device from the connector body.

A resilient circular sealing ring or washer may be optionally seated within the intermediate chamber immediately forward of the leading edge of the locking ring. The arrangement is such that to effect the connection of an electrical metallic tube to the connector body, one need only push one end of the electrical metallic tube through the inlet opening and through the locking or gripping tangs of the locking device.

In another form of the invention, the locking device may be secured within the connector body by a lock nut threaded about the periphery of the inlet opening.

The connector or fitting embodying the invention may also be in the form of a coupler for connecting two or more electrical metallic tubes together.

In another embodiment of the invention improved sealing and continuity is obtained. Sealing is improved by extending the intermediate chamber to prevent the flexible gripping tangs from contacting the O-ring seal and providing a contact should on the flange for contacting the electrical panel preventing excessive deformation of the sealing washer by the locknut. Continuity is improved between the connector body and the electrical metallic tubing by providing a plurality of internal radially increasing ribs that increase radially while extending axially or longitudinally within the connector body.

The various embodiments of the respective locking devices include resilient holding tangs which also function as an electric bond or ground.

BRIEF DESCRIPTION OF THE DRAWINGS

FIG. 1 is an exploded view of an electrical metallic tube connector or fitting in which the component parts are shown in section.

FIG. 4 is a top plan view of the blank from which the locking device is formed.

FIG. 4A is a perspective view of the locking ring formed from the blank shown in FIG. 4.

FIG. 7 is an exploded view of another modified form of the invention.

FIG. 8 is a sectional view of the embodiment of FIG. 7 showing the component parts in an assembled position.

FIG. 9 is a plan view of a modified blank from which the locking device is formed.

FIG. 9A is a perspective view of the blank of FIG. 9 rolled to define a modified form of a locking device.

FIG. 10 is a perspective view of still another form of the invention.

FIG. 11 is a fragmentary sectional side view taken along line 11-11 of the embodiment of FIG. 10.

FIG. 12 is a perspective view of still another form of the invention.

FIG. 13 is a sectional side view taken along line 13-13 in the embodiment of FIG. 12.

FIG. 21 is a cross sectional view of another embodiment of an electrical metallic tube coupler.

FIG. 22 is a cross sectional view of another embodiment of an electrical metallic tube coupler.

DETAILED DESCRIPTION OF THE PREFERRED EMBODIMENTS

Figure 2:
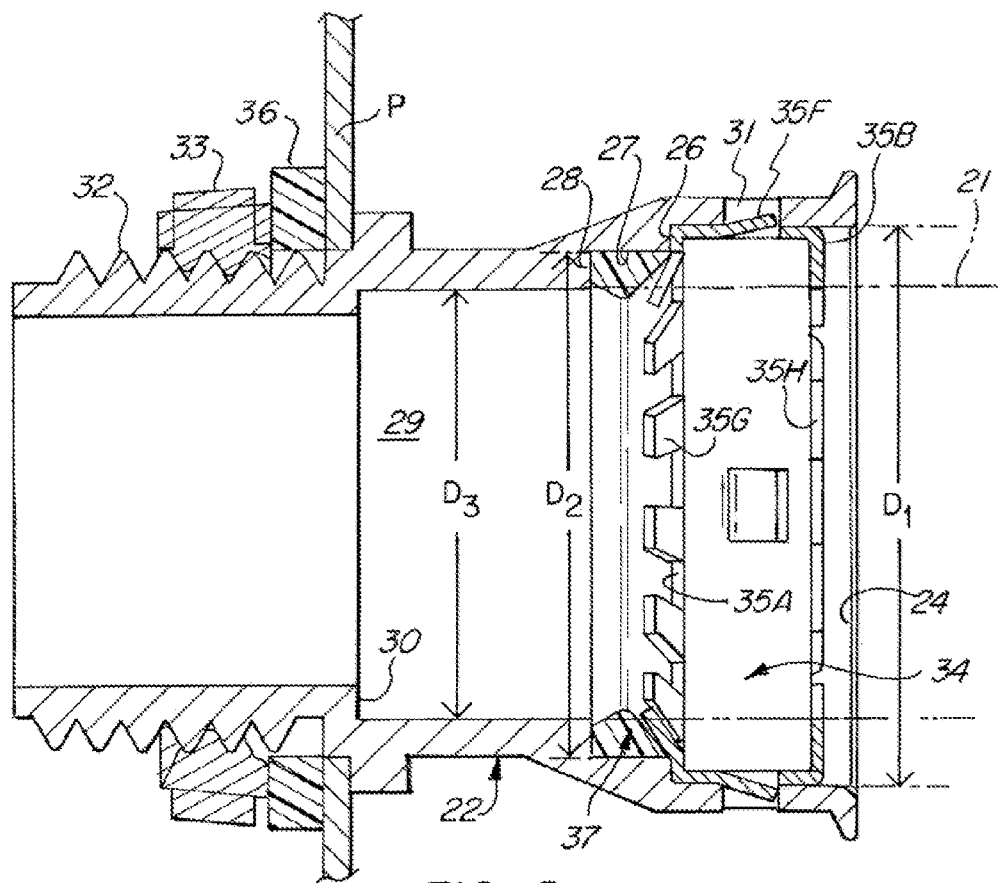
FIG. 2 is a section view of the connector or fitting of FIG. 1 shown in the assembled position thereof.

Referring to the drawings, FIGS. 1 to 4 illustrate an electrical connector or fitting 20 for attaching a conduit or an electrical metallic tube (EMT) 21 to an electric box or panel (not shown). Tube or conduit as interchangeably used herein are to be accorded their usual dictionary definition unless otherwise specified. The connector or fitting 20 includes a connector body 22 having an inlet portion A and an outlet portion B. Circumscribing the connector body exteriorly thereof is a radially outwardly extending flange 23, which functions as a stop to limit the distance the connector 20 may be inserted through a knockout hole of an electric box or panel, P.

As best shown in FIG. 1, the inlet portion A of the connector body 22 is formed so as to define an enlarged inlet opening circumscribing and defining an outer chamber 25 having a diameter $D_1$, terminating at the inner end thereof by a shoulder 26. Concentrically disposed adjacent the outer chamber 25 is an intermediate chamber 27 having a smaller diameter $D_2$, the inner end being defined by shoulder 28. Adjacent the intermediate chamber 27 and concentric therewith is a smaller tube chamber 29 having a diameter $D_3$ sized to snugly receive an end portion of an electrical metallic tube or conduit 21, adapted to be fitted or connected to the connector body 22. The inner end of the tube chamber 29 is defined by a shoulder 30 which forms a stop to limit the distance a tube or conduit 21 may be inserted therein.

In accordance with this invention, the portion of the connector body 22 defining the outermost chamber 25 is provided with one or more tang openings or apertures 31 circumferentially spaced therearound. The outlet portion B of the connector body is provided with external threading 32, which is adapted to be inserted through a knockout hole of an electric box or panel P to which the connector 20 may be secured by a locknut 33 or other suitable means, e.g. a snap fit retainer ring of a type disclosed in U.S. Pat. No. 6,935,891, which is incorporated herein by reference.

Figure 3:
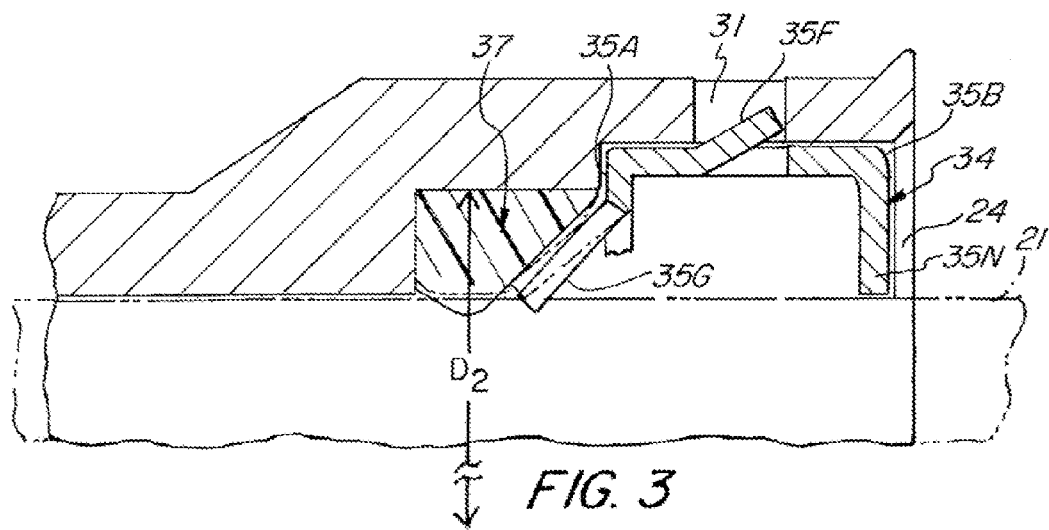
FIG. 3 is an enlarged fragmentary portion of the assembly of the connector or fitting of FIGS. 1 and 2, shown in section.

According to this invention, a unidirectional locking device 34 is provided so as to enable one to attach an electrical metallic tube 21 thereto simply by pushing an end portion of tube 21 into the inlet portion of the connector body. This is attained by forming the locking device 34 from a blank of spring steel 35. As best seen in FIG. 3, the locking device 34 is preferably formed of an elongated strip or blank of spring steel 35 or the like which is stamped and die cut or formed as illustrated in FIG. 4, which is subsequently rolled or formed in a configuration as best seen in FIG. 4A. Referring to FIG. 4, the blank 35 includes a leading portion 35A, a trailing portion 35B and an intermediate portion 35C therebetween. As noted in FIG. 4, one end of the blank 35 is provided with a tongue 35D which is adapted to mate with notch 35E when the blank is rolled into its final form, as best noted in FIG. 1. Blanked out or die cut out of the planar intermediate portion 35C of the blank 35 are one or more holding tangs 35F which are arranged to be cantileverly bent outwardly and having the free end thereof arranged to engage or snap into a corresponding tang opening 31 in the assembled position thereof, as noted in FIGS. 2 and 3.

The leading end portion 35A of the blank 35 is provided or shaped to form a series of gripping tangs or teeth 35G. The trailing end portion 35B is provided with a series of spaced apart tube support tangs 35H, the respective free ends of the tube support tangs 35H being arcuately shaped so that in the final assembled form, the tube support tangs 35H define the inlet opening to the inlet end portion A.

To form the blank 35 into its final form, the leading end portion 35A is inwardly bent along foldline $F_1$ and the trailing end portion 35B is inwardly folded or bent along foldline $F_2$, and the blank rolled to form its final circular configuration as shown in FIG. 4A. In forming the locking device 34, the gripping tangs or teeth 35E are inwardly and obliquely offset in the direction of the outlet end portion B of the connector body 22. The outer diameter of the locking device 34 is sized so that the locking device 34 can be snugly received within the outer chamber 25 of the inlet end portion A as noted in FIGS. 2 and 3.

If it is desirable to render the connector rainproof, a resilient sealing washer 37 may be interposed in the intermediate chamber 27. As best seen in FIGS. 2 and 3, the resilient sealing washer 37 is generally in the form of a truncated triangle in cross section wherein the outer periphery of the sealing washer defines the base portion of the general triangular cross section, having a width substantially equal to the width of the intermediate chamber 27. The short side of the triangularly shaped cross section of the sealing washer 37 is disposed at approximately a 90° angle to the base outer periphery and the hypotenuse of the triangular cross section is disposed at an angle generally complementing or at a slight angle relative to the oblique angle of the gripping teeth or tangs 35H in the relaxed state as best seen in FIG. 2. The outer diameter of the sealing washer is sized so as to be snugly received within the intermediate chamber 27. The inner diameter of the washer 37 is slightly less than the outer diameter of the tube 21, adapted to be fitted to the described connector so that when the end of the tube 21 is inserted into the inlet portion A and through the locking device and associated sealing washer 37, the apex portion of the sealing washer will compress so as to impart a sealing contact pressure on the tube 21 so as to effectively prohibit any moisture or rain water to pass by the sealing washer 37 and toward the outlet end portion B extending into an electric box or panel. A suitable sealing washer material may be neoprene, nitrile or other suitable resilient like material. It will be understood that the connector body 22 may be suitably molded or cast out of zinc, steel or other suitable metal or alloy.

In assembly, the resilient sealing washer 37 is positioned in the intermediate chamber 27 of the inlet end portion A so that the short side of the resilient sealing washer 37 is in abutment with shoulder 28. The locking device 34 is inserted into the outer chamber 25 of the inlet end portion oriented so that the holding tangs 35F are in line with the tang openings 31. The arrangement is such that the split locking device may be compressed so as to close the gap between the opposed ends thereof so that the locking device 34 may be readily inserted or press-fitted into the outer chamber 25 until the leading edge abuts up against shoulder 26. Upon insertion of the locking device into chamber 25, the holding tangs 35F will initially be forced inwardly toward the intermediate planar surface 35C and then will inherently spring outwardly as the holding tangs 35F are brought into alignment with its corresponding tang opening 31 so as to secure the locking device 34 within chamber 25. With the locking device secured within chamber 25, the gripping tang will be obliquely directed toward the hypotenuse of the sealing washer 37 in a relaxed state so as to define a slight angle therebetween, as noted in FIG. 2.

With the sealing washer 37 and locking device 34 so disposed and retained within the inlet end portion 13 of the connector body 22, one need only to push an electrical metallic tube 21 pass the gripping tangs 35B of the locking device 34 and the sealing washer until the end of the tube 21 engages the stop shoulder 30. As the tube 21 is pushed through the ring of locking tangs, the tangs are slightly displaced to close the slight angle normally disposed between the hypotenuse of the sealing washer and gripping tangs (as best seen in phantom in FIG. 3). As a result, the gripping tangs effect an inherent gripping force on the tube so as to resist any opposing or pulling force that may be applied onto the tube in an effort to effect separation of the tube from the connector body 22. With the tube 21 so connected, the arrangement is such that the tube 21 is also firmly supported both at its inner end by the snug fitting relationship with support chamber 29 and by the support tangs 35H of the locking device 34 which are spaced apart from the support chamber. Accordingly, the two point support for the tube serve to resist any unwanted bending stresses to which the tube may be subjected.

To attach the connector body to an electric box or panel, the threaded outlet end portion B is sized so as to be readily insertable through any standard knockout opening. The connector body is secured to the electric box or panel by the lock nut 33 in the usual manner. If desired, a resilient sealing washer 36 may be interposed between the lock nut 33 and the wall of an electric box or panel P to prohibit any moisture or rain from entering through the knockout hole. It will be understood that the outlet end portion B may be formed or fitted with snap fit retaining ring as hereinbefore noted, by which the connector body may be secured to an electric box or panel.

Figure 5:
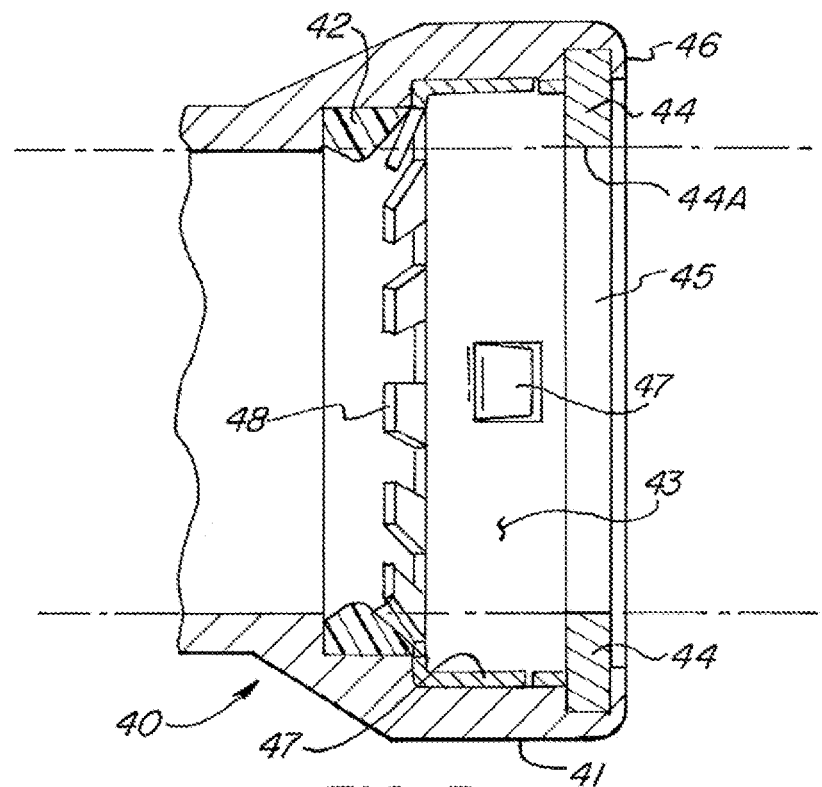
FIG. 5 is a fragmentary sectional view of a modified form of the invention.

FIG. 5 illustrates a slightly modified embodiment of the invention. In this form of the invention, the connector 40 includes a connector body 41 similar to that hereinbefore described. The embodiment of FIG. 5 differs from the embodiment of FIGS. 1 to 4 in that the outer chamber is devoid of any tang openings 31 as previously described. Also, the locking device 43 differs from the locking device 34 as described and shown in FIGS. 4 and 4A. The locking device 43 is similar to that illustrated in FIG. 9A, as will be hereinafter described. Essentially, the locking device 43 of the embodiment of FIG. 5 is devoid of the tube support tangs 35H, previously described. In lieu thereof, a backup washer 44 having a central opening 44A sized to snugly receive the electrical metallic tube 21 functions as a tube support. Disposed within the intermediate chamber is the resilient sealing washer 42 which is similar to that previously described. To retain the backup washer 44, the locking device 43 and the resilient sealing washer 42 in their respective position, the connector body is provided with an interned lip 46 which is radially and inwardly bent or swaged or deformed to secure the respective components permanently in place. In this form of the invention, the tangs 47 formed about the intermediate planar portion of the locking device are maintained in the compressed state when the locking device 43 is disposed with its outer chamber. Due to the inherent resiliency of the tangs 47 and the tendency of tangs 47 to assume its outwardly bent relaxed state, a positive electric grounding effect is assured. In this form of the invention, the sealing washer 42, the locking device 43 and the backup washer 44 are permanently secured within the connector body. To attach a metal tube 21 to the connector body, one need only to push an end portion of a tube 21 through the inlet opening 44A of the washer 44 and pass the gripping tangs 48 of the locking device 43.

Figure 6:
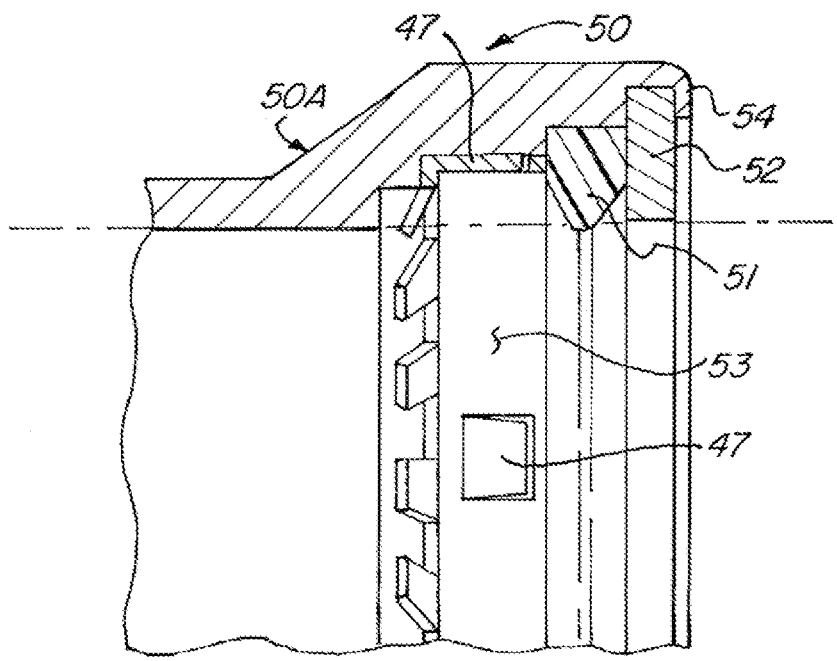
FIG. 6 is a fragmentary sectional view of another modified form of the invention.

FIG. 6 illustrates another slightly modified embodiment of the invention. In this embodiment, the connector body 50 has been modified to the extent that the inlet end portion 50A has been slightly modified to accommodate the resilient sealing washer 51 between the backup washer 52 and the locking device 53. Like in FIG. 5, the connector body 50 adjacent the inlet opening is provided with a radially inwardly formed lip or flange 54 which functions to lock the locking device 53 and the resilient sealing washer 51 in place within the inlet end portion 50A. As hereinbefore described to secure a tube 21 to the connector body 50, one need only insert the end portion of a tube 21 into the inlet end portion 50A until the end of the tube engages the innermost stop, as hereinbefore described. In all other respects, the structure and function is similar to that hereinbefore described.

FIGS. 7 to 9 illustrate a further embodiment of the invention. In this form of the invention, the connector 60 includes a connector body 61 similar to that hereinbefore described with respect to FIG. 1, except that the inlet end portion 60A is provided with an externally threaded portion 62 circumscribing the inlet opening 63. Essentially, the inlet end portion 60A has an outer chamber 64 and intermediate chamber 65 and tube receiving chamber 66 as previously described.

In this form of the invention, the locking device 67 is also slightly modified. Referring to FIG. 9, the locking device 67 is formed out of an elongated blank 68 of suitable spring steel metal having opposed end portions, one end having a projecting tongue 68A and a notch 68B formed in the other end of the blank. The blank also has a leading edge portion 68C, a trailing edge 68D and a planar intermediate portion 68E therebetween. The blank 68 also includes a series of tangs 69 that are die cut or blanked out of the plane of the intermediate portion 68E, the free end of tangs 69 being outwardly bent relative to the plane of the intermediate portion from which the tangs 69 are formed. To form the locking device 67, the blank 68 so formed is rolled into a circular ring wherein the projecting tongue 68A is fitted into notch 68B of the other end. The leading edge portion of the blank 68 is rolled or progressively bent radially inwardly along foldline $F_3$ to form a substantially 90° angle at the corner thereof as best seen in FIG. 8. As hereinbefore described, a series of gripping teeth or tangs 70 along the leading edge of the locking device 67 are normally obliquely bent outward toward the tube holding chamber 66. Securing the locking device 67 and the sealing ring 71 within the inlet end portion 60A of the connector body 61 is a back nut 72, which is provided with internal threading 72A by which it can be threaded onto the external threads 62 on the end of the connector body 61. The back nut 72 is provided with a center opening 72B having a diameter sized to accommodate a tube 21 associated therewith. To lock and secure a tube 21 to the connector 60, one simply needs to push the tube 21 through the back nut opening 72B, the locking device 67, the resilient sealing washer 71 and into the tube chamber 66 until the end of the tube abuts against the stop shoulder 66A.

In this form of the invention, it is to be noted that in positioning the locking device 67 into the inlet chamber portion 64, the arrangement is such that the tangs 69 of the locking device 67 are compressed inwardly so that when the locking device is fully seated within chamber 64, the inherent resiliency of the tangs 69 tend to exert an outwardly biasing force against the inner surface of chamber 64. The inherent biasing force imparted by the tangs 69 onto the internal surface of the chamber 64 ensures that the tangs 69 are maintained in positive contact with the internal surface of the connector body 61 to provide a positive electrical grounding effect.

In all other respects, connector 60 is structurally and functionally similar to the embodiment described with respect to the embodiment of FIGS. 1 to 4.

FIGS. 10 and 11 are directed to another modified form of the invention. This embodiment is directed to a connector 80 which is similar to the connector 60 as shown in FIGS. 7 to 9, except that the connector body 81 is provided with internal threads 82 circumscribing the inlet opening 83 to the outer chamber 84. The locking device 85 and the resilient sealing washer 86 are similar to those described with respect to FIGS. 7 to 9. In the embodiment of FIGS. 10 and 11, the locking device 85 and sealing washer 86 are secured within the inlet end portion of the connector body 81 by a back nut 87 having a short externally threaded stem 87A and a radially outwardly extending flange 87B whereby the internal thread stem 87A engages the inlet threads 82 of the connector body 81. In all other respects, the connector 80 is similar to connector 60 of FIGS. 7 to 9.

FIGS. 12 to 13 illustrate a further application of the invention described herein. As shown, the embodiment of FIGS. 12 and 13 is directed to a connector in the form of a coupler 90 for connecting at least two electrical metallic tubes together. Coupler 90 includes a metal casting formed of a suitable metal or alloy as hereinbefore noted, which has an integral cylindrical center portion 91 terminating in opposed outwardly flaring end portions 91A, 91B. In the illustrated embodiment, the respective end portions 91A, 91B are identical mirror images of the other. However, it will be understood that the end portion need not be of the same size and that the dimensions thereof may be varied to accommodate varying size tubes 21.

In the illustrated embodiment of FIGS. 12 and 13, each end portion 91A, 91B are formed with an outer chamber 92A, 92B, an intermediate chamber 93A, 93B, and a tube support chamber 94A, 94B similar to that described with respect to the embodiment of FIGS. 1 to 4. Intermediate the cylindrical portion 91 of the coupler, there is provided an internal rib or flange 95 which functions as a stop for the tube end. Circumferentially spaced about the respective end portions 91A, 92B are one or more holes or apertures 96.

The locking devices 97A, 97B and resilient sealing washers 98A, 98B are similar in structure and function as hereinbefore described with respect to FIGS. 1 to 4, and need not be repeated.

In this form of the invention, the resilient sealing washers 98A, 98B and locking devices 97A, 97B are positioned and secured within their respective chambers similar to that described in FIGS. 1 to 4. Thus, all of the features and advantages noted with respect to the embodiment of FIGS. 1 to 4 are also achieved when employed in a coupler type fitting of FIGS. 12 and 13.

Figure 14:
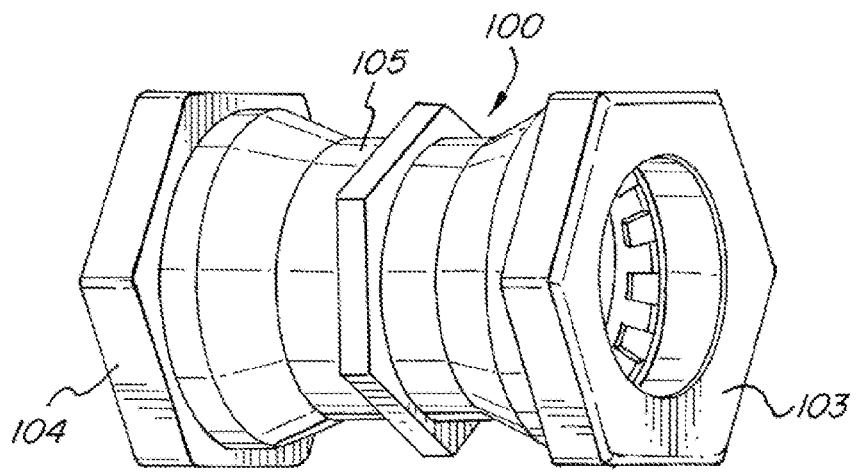
FIG. 14 is a perspective view of still another form of the invention.
Figure 15:
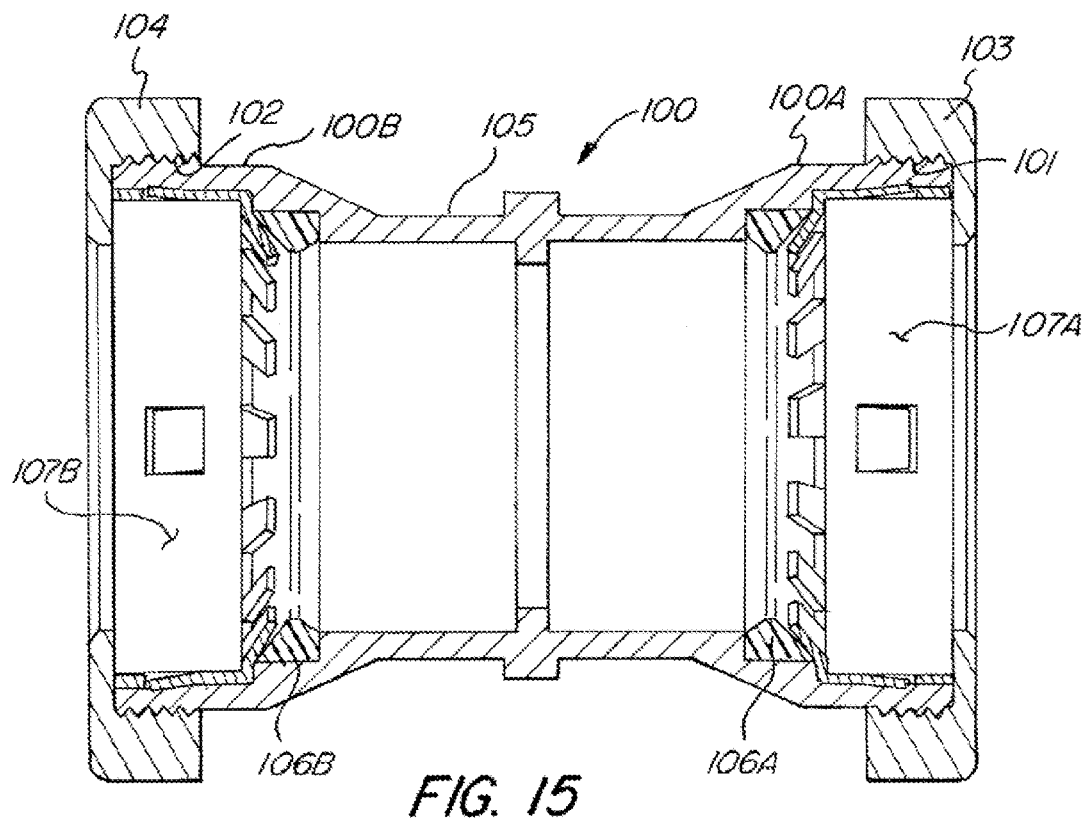
FIG. 15 is a sectional side view of the embodiment of FIG. 14.

FIGS. 14 and 15 are directed to another embodiment of the invention. In this form, the invention is directed to a modified coupler 100 which is similar in virtually all respects to that described with respect to FIGS. 12 and 13, except that the opposed enlarged inlet end portions 100A, 100B are provided with external threads 101 and 102 respectively for receiving a backup nut 103, 104, similar to that hereinbefore described. Also, in this form of the invention, the coupling body 105 does not require any tang openings 96, as described with respect to the embodiment of FIGS. 12 and 13.

The resilient sealing ring 106A, 106B and locking device 107A, 107B are similar to the respective sealing ring and locking device as described with respect to the embodiment of FIGS. 7 and 8. In all other respects, the embodiment of FIGS. 13 and 14 are structurally and functionally similar to that disclosed and described with respect to the embodiment of FIGS. 7 to 9.

From the foregoing disclosure, it will be apparent that the push-on type of connectors herein are described as being primarily useful for connecting an electrical metallic tube or EMT. However, the described fittings may also be utilized as a connector for non electric tubes, e.g. plastic tubes and the like. As described herein, the novelty resides primarily in the resilient sealing washer having a generally truncated triangular cross sectional shape and a locking device which is rendered reusable, and which is formed to positively provide a unidirectional gripping force on the associated tube or conduit, and in one form a support for the associated tube to resist any bending forces imparted on the tube at the point of connection, and to provide an electrical bonding path when used with metallic tubing.

As in certain of the described embodiments, the locking device is provided with holding tangs co-operationally associated with corresponding tang openings formed in the inlet end portion of the connector body for positively securing the locking device within the inlet end portion, whereby the use of a backup nut may be eliminated to further simplify the structure of the described embodiments. In addition to the holding tang of the locking device, in one form of the invention described herein may also function as a very positive electrical grounding means.

In their respective entirety, the connector embodiments described herein greatly simplify the manufacturing and assembly of such connectors, reduces the costs thereof, and provides an arrangement whereby a tube or conduit associated therewith can be simply attached thereto by merely pushing one end of the conduit or tube through the inlet opening and through the unidirectional locking device that will resist any opposing force or pulling force which may be imparted on the tube to prohibit any separation. The described embodiments utilizing a backup nut, achieve a further advantage in that simple removal of the backup nut provides a means for readily removing the tube or conduit in the event disassembly is required without effecting or imparting any damage to the component parts, thereby rendering the components reusable.

FIGS. 16-22 illustrate additional embodiments of the present invention that provide improved continuity and sealing. FIGS. 16-19 illustrate an embodiment that is similar to the embodiment illustrated in FIG. 1, however, the embodiment illustrated in FIGS. 16-19 has improved continuity and sealing. The improved continuity provides a reduced voltage drop across the electrical fitting or connector.

Figure 16:
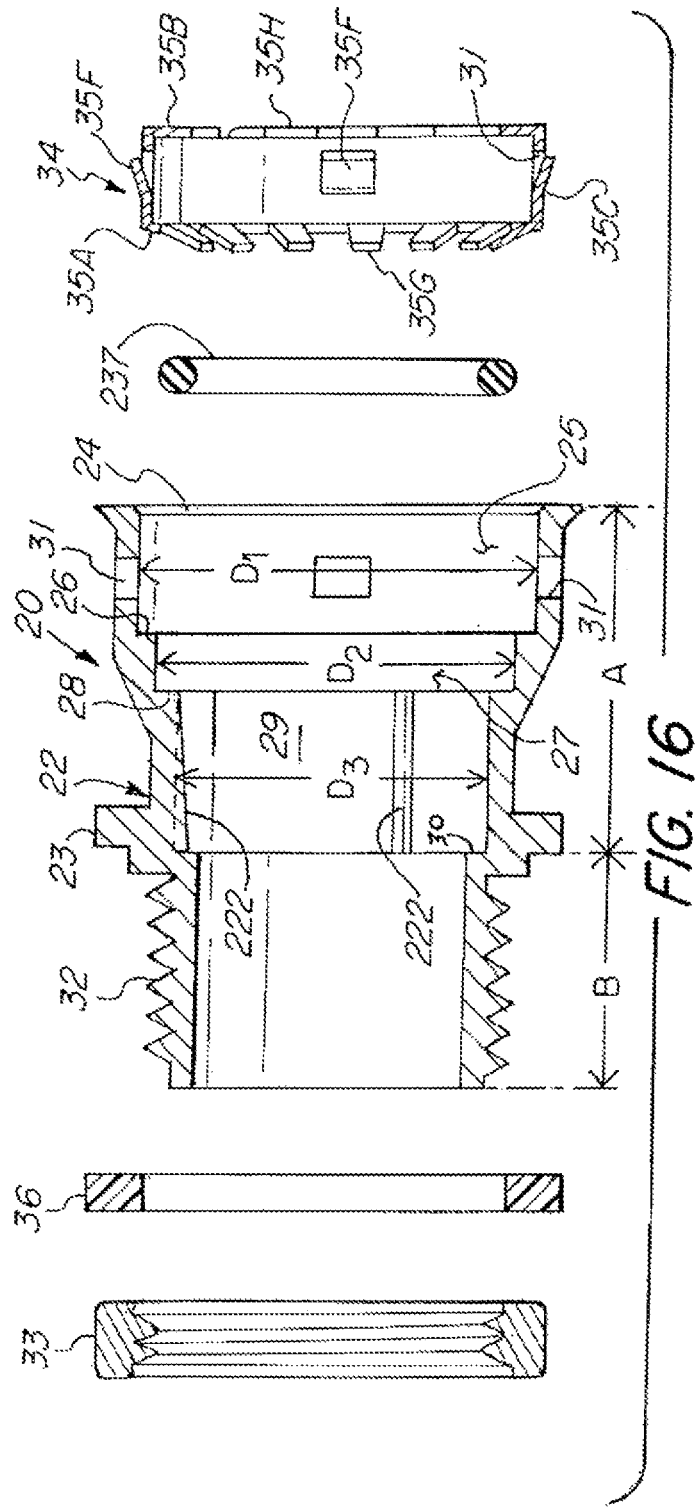
FIG. 16 is an exploded view of another embodiment of an electrical metallic tube connector or fitting in which the component parts are shown in section.

In FIG. 16, the connector body 22 has a plurality of internal longitudinal radially increasing ribs 222. There are preferably three ribs 222 separated by approximately one-hundred and twenty degrees. The ribs 222 increase radially progressing longitudinally from shoulder 28 to the shoulder 30. Accordingly, the ribs 222 effectively reduce the diameter distance $D_3$ of the tube chamber 29 progressing longitudinally from shoulder 28 to shoulder 30. Additionally, in this embodiment an O-ring 237 is used and positioned in the intermediate chamber 27. The O-ring 237 is positioned so as not to contact the gripping tangs 35G when the unidirectional locking device 34 is placed within the outer chamber 25 and an electrical metallic tube or EMT is placed within the connector or fitting 20. This prevents deformation of the O-ring 237 and reduces the possibility of leaks.

Figure 17:
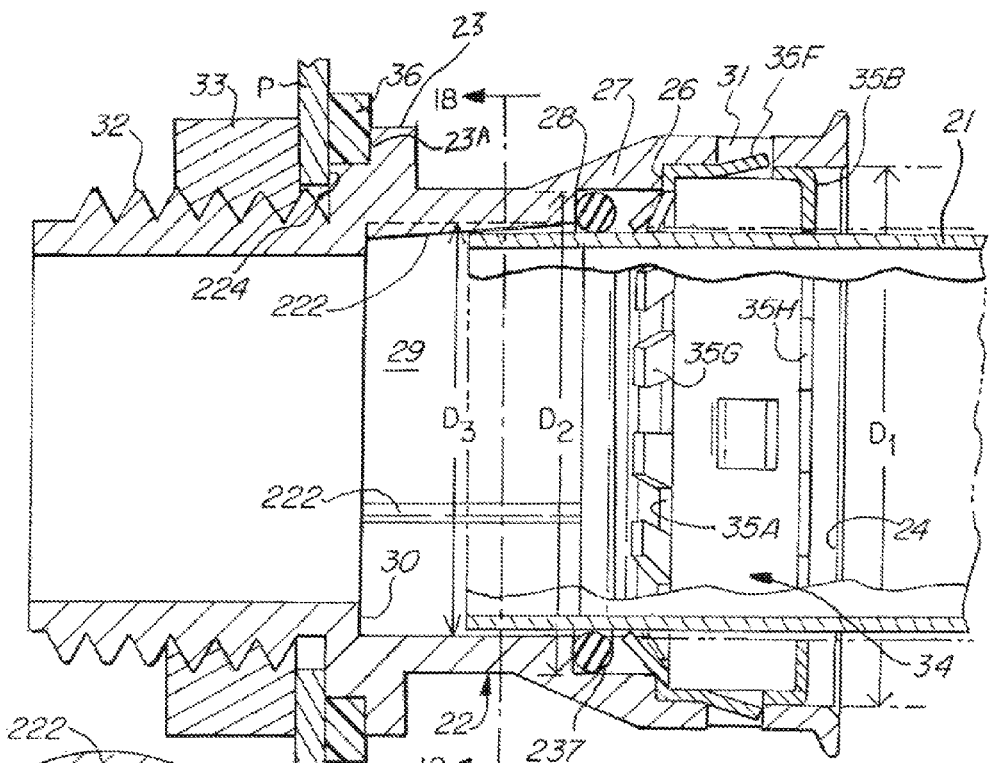
FIG. 17 is a cross sectional view of the connector or fitting of FIG. 16 shown assembled.

FIG. 17 illustrates the connector or fitting 20 illustrated in FIG. 16 in an assembled state and with an electrical metallic tube or EMT 21 placed within the connector or fitting 20. The internal longitudinal radially increasing ribs 222 placed within the tube chamber 29 of the connector body 22 contact the leading edge of the tube 21. The ribs 222 assure a good electrical contact between the tube 21 and the connector body 22. The ribs 222 extend into the tube chamber 29 by an increasing radial dimension from the shoulder 28 to the shoulder 30. The maximum increase in radial dimension of the ribs 222 should be approximately the expected variance in the dimension of the tube 21. Generally, electrical metallic tubes or EMTs will have dimensional tolerances resulting in the diameter being within a limited range. For a nominal one-half inch tube, the outside diameter dimension may vary 0.10 inches. Therefore, for a nominal one-half inch tube, the ribs 222 preferably extend radially into the tube chamber 29 a maximum of 0.10 inches. Accordingly, as the tube 21 is inserted into the tube chamber 29 the leading edge of the tube 21 contacts the ribs 222 providing a secure fit. The leading edge of the tube 21 will also shave a small portion of the ribs surface resulting in a clean electrical contact improving continuity. The connector body 22 is preferably made of a die cast zinc alloy and is typically softer than the material of tube 21. This causes ribs 222 to be shaved or cut as the tube 21 is inserted resulting in a clean good electrical and mechanical contact being provided. In experimental connectors or fittings, fittings with the ribs 222 resulted in a substantially reduced voltage drop across the fitting. Fittings with the ribs 222 had an eighty percent reduction in voltage drop across the fitting using a short circuit current of 30 amps DC as compared to fittings without the ribs 222. While the primary function of the ribs 222 is to improve electrical continuity and decrease a voltage drop across the fitting, the ribs 222 may also provide a contact point holding an end of the tube 21 restricting movement which may improve sealing.

FIG. 17 also illustrates the improved sealing with a connection to the electrical box or panel P. As illustrated in FIG. 17, flange 23 has a flange shoulder 23A that acts as a stop for the sealing washer 36. Sealing washer 36 is made of a compressible elastomeric or rubber material. The locknut 33 forces the panel P against the sealing washer 36, and the sealing washer 36 is forced against the flange shoulder 23A. A contact shoulder 224 is formed on and extends from the flange 23. The contact shoulder 224 has a diameter greater than an opening in the panel P so that when the locknut 33 is forces against the panel P, the panel P will contact the contact shoulder 224 formed on and extending from the flange 23. The distance between the flange shoulder 23A and the contact shoulder 224 is set so that the sealing washer 36 is prevented from being excessively compressed, which could result in improper or faulty sealing. The sealing washer 36 is prevented from being excessively compressed and deformed by the panel P contacting the contact shoulder 224. This improves the ability of the fitting to seal out moisture or be rain tight. Additionally, the contact shoulder 224 permits the locknut 33 to be tightened against the panel P with additional torque due to the bottoming out or contact with the contact shoulder 224. This additional torque results in a higher metal to metal or conductor to conductor clamping or contact force which lowers contact resistance and improves overall electrical continuity.

Figure 18:
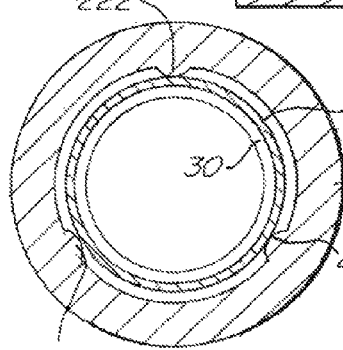
FIG. 18 is a cross section taken along line 18-18 in FIG. 17.

FIG. 18 is a cross section taken along lines 18-18 in FIG. 17 and illustrates ribs 222 contacting the tube 21. The ribs 222 also aid in centering the tube 21 within the connector body 22.

Figure 19:
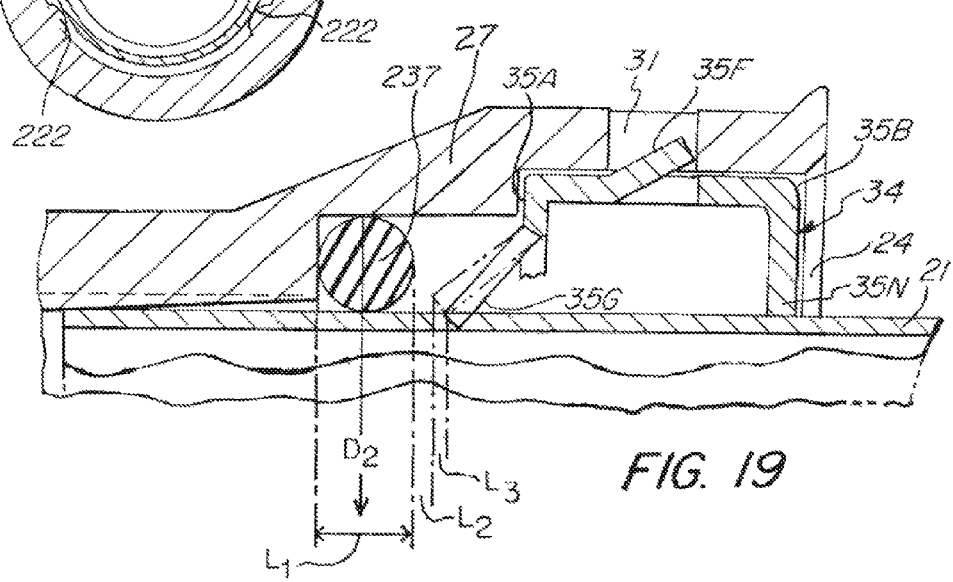
FIG. 19 is an enlarged partial cross sectional view illustrating the dimensional relationship between the flexible gripping tangs and the O-ring seal.

FIG. 19 is a partial cross section illustrating the improved seal between the O-ring 237 and the tube 21 due to the dimensions of the intermediate chamber 27 and the flex of the gripping tangs 35G. The O-ring 237 is placed in the intermediate chamber 27 and has a longitudinal or axial dimension $L_1$ equal to the diameter of the O-ring 237. The unidirectional locking device 34 is positioned in the fitting so that the travel distance $L_3$ of the gripping tangs 35G always results in a gap distance $L_2$ between the O-ring 237 and gripping tangs 35G. That is, the intermediate chamber 27 longitudinal or axial dimension is greater than the combined longitudinal or axial travel distance $L_3$ of the plurality of griping tangs and the sealing ring longitudinal or axial dimension $L_1$. Therefore, a gap distance $L_2$ is maintained between the O-ring 237 and the gripping tangs 35G. This prevents the gripping tangs 35G from contacting the O-ring 237 and possibly compromising the sealing contact surface between the O-ring 237 and the tube 21.

Figure 20:
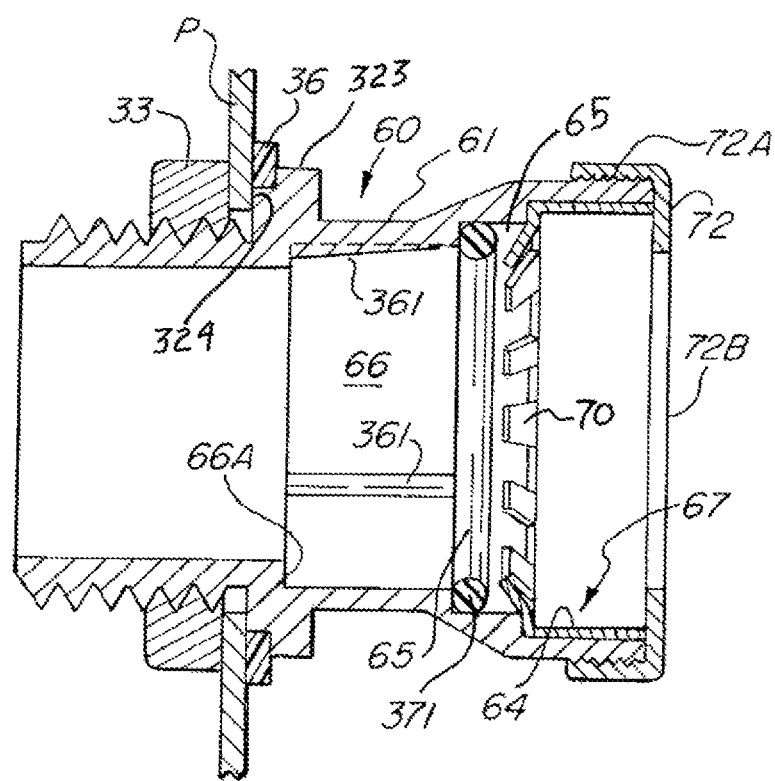
FIG. 20 is a cross sectional view of another embodiment of an electrical metallic tube connector or fitting.

FIG. 20 is another embodiment of a connector or fitting 60 that uses a back nut 72 to retain the unidirectional locking device 67 within the chamber portion 64. This embodiment also includes the improved continuity and sealing features illustrated in FIGS. 16-19 and is similar to the embodiment illustrated in FIG. 7. In this embodiment the connector body 61 has a plurality of internal longitudinal radially increasing ribs 361. Also similar to the embodiment illustrated in FIG. 16, an O-ring 371 is placed within the intermediate chamber 65 of the connector body 61. The longitudinal or axial dimensions of the intermediate chamber 65, the O-ring 371, and the gripping teeth or tangs 70 are such that when the gripping teeth or tangs 70 flex to hold a tube, not illustrated, the gripping teeth or tangs 70 do not contact the O-ring 371. Also flange 323 has a contact shoulder 324 that contacts the panel P preventing the panel P from excessively deforming the sealing washer 36.

FIG. 21 illustrates a coupler for coupling two tubes together. The coupler illustrated in FIG. 21 is similar to the coupler illustrated in FIGS. 12 and 13. However, the embodiment illustrated in FIG. 21 provides improved sealing and continuity. In this embodiment the coupler body 90 has a plurality of internal longitudinal radially increasing ribs 490 and 492. O-ring seals 498A and 498B are placed within respective intermediate chambers 93A and 93B of the coupler body 90. The longitudinal or axial dimensions of the intermediate chambers 93A and 93B, the O-rings 498A and 498B, and the travel distance of gripping teeth or tangs 35G are such that when the gripping teeth or tangs 35G flex to hold a tube, not illustrated, the gripping teeth or tangs 35G do not contact the respective O-rings 498A and 498B.

FIG. 22 illustrates a coupler for coupling two tubes together. The coupler illustrated in FIG. 22 is similar to the coupler illustrated in FIGS. 14 and 15. However, the embodiment illustrated in FIG. 22 provides improved sealing and continuity. In this embodiment the coupler body 100 has a plurality of internal longitudinal radially increasing ribs 505 and 506. O-ring seals 506A and 506B are placed within respective intermediate chambers of the coupler body 100. The longitudinal or axial dimensions of the intermediate chambers, the O-rings 505 and 506, and the travel distance of gripping teeth or tangs 70 are such that when the gripping teeth or tangs 70 flex to hold a tube, not illustrated, the gripping teeth or tangs 70 do not contact the respective O-rings 506A and 506B.

The embodiments illustrated in the present invention, particularly as illustrated in FIGS. 16-22, provides an electrical fitting that has superior sealing and continuity with a reduced voltage drop. This improves the safety of the electrical fitting as well as performance in moist or wet locations.

While the present invention has been described with respect to several embodiments, it will be understood that various modifications may be made without departing from the spirit or scope of the invention.

What is claimed is:

1. An electrical push-in fitting for holding an electrical metallic tube comprising:
   a fitting body having an inlet end portion, an outlet end portion, and a bore extending therethrough,
   an outer chamber adjacent the inlet end portion;
   an intermediate chamber having an intermediate chamber axial dimension adjacent said outer chamber;
   a tube chamber placed adjacent said intermediate chamber;
   a unidirectional locking device having a plurality of gripping tangs placed within said outer chamber, with the plurality of gripping tangs extending into the intermediate chamber, wherein upon inserting the electrical metallic tube into the unidirectional locking device the plurality of gripping tangs flex a longitudinal or axial travel distance towards said tube chamber gripping the electrical metallic tube;
   a sealing ring having a sealing ring longitudinal or axial dimension placed within said intermediate chamber adjacent said tube chamber;
   wherein the intermediate chamber axial dimension is greater than the combined longitudinal or axial travel distance of the plurality of griping tangs and the sealing ring longitudinal or axial dimension and movement of the plurality of gripping tangs do not cause any contact with said sealing ring, whereby the plurality of gripping tangs are prevented from contacting or causing contact with said sealing ring; and
   a unidirectional locking device retainer held on said outer chamber.

2. An electrical push-in fitting for holding an electrical metallic tube comprising:
   a fitting body having an inlet end portion, an outlet end portion, and a bore extending therethrough,
   an outer chamber adjacent the inlet end portion;
   an intermediate chamber having an intermediate chamber axial dimension adjacent said outer chamber;
   a tube chamber placed adjacent said intermediate chamber;
   a unidirectional locking device having a plurality of gripping tangs placed within said outer chamber, with the plurality of gripping tangs extending into the intermediate chamber, wherein upon inserting the electrical metallic tube into the unidirectional locking device the plurality of gripping tangs flex a longitudinal or axial travel distance towards said tube chamber gripping the electrical metallic tube;

a sealing ring having a sealing ring longitudinal or axial dimension placed within said intermediate chamber adjacent said tube chamber;

wherein the intermediate chamber axial dimension is greater than the combined longitudinal or axial travel distance of the plurality of griping tangs and the sealing ring longitudinal or axial dimension, whereby the plurality of gripping tangs are prevented from contacting said sealing ring;

a unidirectional locking device retainer held on said outer chamber; and a plurality of internal longitudinal radially increasing ribs placed within said tube chamber having a radial dimension increasing from an end adjacent said intermediate chamber, whereby a leading edge of the electrical metallic tube contacts the plurality of internal longitudinal radially increasing ribs assuring a good electrical contact between the electrical metallic tube and said fitting body.

3. An electrical push-in fitting for holding an electrical metallic tube comprising:

a fitting body having an inlet end portion, an outlet end portion, and a bore extending therethrough, an outer chamber adjacent the inlet end portion;

an intermediate chamber having an intermediate chamber axial dimension adjacent said outer chamber;

a tube chamber placed adjacent said intermediate chamber;

a unidirectional locking device having a plurality of gripping tangs placed within said outer chamber, with the plurality of gripping tangs extending into the intermediate chamber, wherein upon inserting the electrical metallic tube into the unidirectional locking device the plurality of gripping tangs flex a longitudinal or axial travel distance towards said tube chamber gripping the electrical metallic tube;

a sealing ring having a sealing ring longitudinal or axial dimension placed within said intermediate chamber adjacent said tube chamber;

wherein the intermediate chamber axial dimension is greater than the combined longitudinal or axial travel distance of the plurality of griping tangs and the sealing ring longitudinal or axial dimension, whereby the plurality of gripping tangs are prevented from contacting said sealing ring;

a unidirectional locking device retainer held on said outer chamber;

external threads placed on said outlet end portion;

a flange placed adjacent said external threads;

a contact shoulder placed against said flange, said contact shoulder having an outer diameter less than said flange;

a sealing washer placed adjacent said contact shoulder, said sealing washer having an opening with a diameter greater than the outer diameter of said contact shoulder; and a locknut threaded onto said external threads, whereby said locknut forces said sealing washer against said flange and said contact shoulder prevents excess force being applied to said sealing washier providing a seal.

4. An electrical push-in fitting for holding an electrical metallic tube as in claim 3 further comprising:

a tube support tag formed on said unidirectional locking device retainer.

5. An electrical push-in fitting for holding an electrical metallic tube as in claim 3 wherein:

said unidirectional locking device retainer comprises a holding tang formed within said unidirectional locking device.

6. An electrical push-in fitting for holding an electrical metallic tube comprising:

a fitting body having an inlet end portion, an outlet end portion, and a bore extending therethrough, an outer chamber adjacent the inlet end portion;

an intermediate chamber having an intermediate chamber axial dimension adjacent said outer chamber;

a tube chamber placed adjacent said intermediate chamber;

a unidirectional locking device having a plurality of gripping tangs placed within said outer chamber, with the plurality of gripping tangs extending into the intermediate chamber, wherein upon inserting the electrical metallic tube into the unidirectional locking device the plurality of gripping tangs flex a longitudinal or axial travel distance towards said tube chamber gripping the electrical metallic tube;

a sealing ring having a sealing ring longitudinal or axial dimension placed within said intermediate chamber adjacent said tube chamber;

wherein the intermediate chamber axial dimension is greater than the combined longitudinal or axial travel distance of the plurality of griping tangs and the sealing ring longitudinal or axial dimension, whereby the plurality of gripping tangs are prevented from contacting said sealing ring;

a unidirectional locking device retainer held on said outer chamber; and wherein said unidirectional locking device retainer comprises a threaded back nut.

7. An electrical push-in fitting for holding an electrical metallic tube as in claim 6 further comprising:

an electrical metallic tube pushed into said unidirectional locking device through said intermediate chamber and contacting said plurality of internal longitudinal radially increasing ribs.

8. An electrical push-in fitting for holding an electrical metallic tube as in claim 6 wherein:

the electrical push-in fitting comprises a connector, whereby an electrical metallic tube can be connected to an electrical panel.

9. An electrical push-in fitting for holding an electrical metallic tube as in claim 6 wherein:

the electrical push-in fitting comprises a coupler, whereby two electrical metallic tubes can be coupled together.

10. An electrical push-in fitting for removably holding an electrical metallic tube comprising:

a fitting body having an inlet end portion, an outlet end portion, and a bore extending therethrough, an outer chamber adjacent the inlet end portion;

an intermediate chamber having an intermediate chamber axial dimension adjacent said outer chamber;

a tube chamber placed adjacent said intermediate chamber;

a shoulder placed between said outer chamber and said intermediate chamber;

a unidirectional split ring locking device having a plurality of gripping tangs placed within said outer chamber, with the plurality of gripping tangs extending into the intermediate chamber, wherein upon inserting the electrical metallic tube into the unidirectional locking device the plurality of gripping tangs flex a longitudinal or axial travel distance towards said tube chamber gripping the electrical metallic tube;

a sealing ring having a sealing ring longitudinal or axial dimension placed within said intermediate chamber adjacent said tube chamber;

wherein the intermediate chamber axial dimension is greater than the combined longitudinal or axial travel distance of the plurality of griping tangs and the sealing ring longitudinal or axial dimension, whereby the plurality of gripping tangs are prevented from contacting said sealing ring;

an externally threaded portion placed on said fitting body adjacent the inlet end portion;

a backnut placed on said externally threaded portion on said fitting body, said backnut contacting said unidirectional locking device, wherein a force is transmitted forcing said unidirectional locking device adjacent said shoulder between said outer chamber and said intermediate chamber; and a center opening formed in said backnut, said center opening sized for receiving and supporting the electrical metallic tube, whereby a push-in unidirectional locking arrangement for securing an electrical metallic tube is formed so that the electrical metallic tube can be rendered readily removable.

11. An electrical push-in fitting for removably holding an electrical metallic tube as in claim 10 further comprising:

a plurality of internal longitudinal radially increasing ribs placed within said tube chamber having a radial dimension increasing from an end adjacent said intermediate chamber.

12. An electrical push-in fitting for removably holding an electrical metallic tube as in claim 10 further comprising:

external threads placed on said outlet end portion;

a flange placed adjacent said external threads;

a contact shoulder placed against said flange, said contact shoulder having an outer diameter less than said flange;

a sealing washer placed adjacent said contact shoulder, said sealing washer having an opening with a diameter greater than the outer diameter of said contact shoulder; and a locknut threaded onto said external threads, whereby said locknut forces said sealing washer against said flange and said contact shoulder prevents excess force being applied to said sealing washier providing a seal.

13. An electrical push-in fitting for removably holding an electrical metallic tube as in claim 10 wherein:

the electrical push-in fitting comprises a connector, whereby an electrical metallic tube can be connected to an electrical panel.

14. An electrical push-in fitting for removably holding an electrical metallic tube as in claim 10 wherein:

the electrical push-in fitting comprises a coupler, whereby two electrical metallic tubes can be coupled together.

15. An electrical push-in fitting for securely yet removably holding an electrical metallic tube comprising:

a fitting body having an inlet end portion, an outlet end portion, and a bore extending therethrough, an outer chamber adjacent the inlet end portion;

an intermediate chamber having an intermediate chamber axial dimension adjacent said outer chamber;

a tube chamber placed adjacent said intermediate chamber;

a plurality of internal longitudinal radially increasing ribs placed within said tube chamber having a radial dimension increasing from an end adjacent said intermediate chamber;

a shoulder placed between said outer chamber and said intermediate chamber;

a unidirectional split ring locking device having a projecting tongue on one end and a complementary notch on the other end and a plurality of gripping tangs projecting obliquely and radially inward placed within said outer chamber, with the plurality of gripping tangs extending into the intermediate chamber, wherein upon inserting the electrical metallic tube into the unidirectional locking device the plurality of gripping tangs flex a longitudinal or axial travel distance towards said tube chamber gripping the electrical metallic tube;

a sealing ring having a sealing ring longitudinal or axial dimension placed within said intermediate chamber adjacent said tube chamber;

wherein the intermediate chamber axial dimension is greater than the combined longitudinal or axial travel distance of the plurality of griping tangs and the sealing ring longitudinal or axial dimension, whereby the plurality of gripping tangs are prevented from contacting said sealing ring;

a inlet externally threaded portion placed on said fitting body adjacent the inlet end portion;

a backnut placed on said inlet externally threaded portion on said fitting body, said backnut contacting said unidirectional locking device, wherein a force is transmitted forcing said unidirectional locking device adjacent said shoulder between said outer chamber and said intermediate chamber;

a center opening formed in said backnut, said center opening sized for receiving and supporting the electrical metallic tube;

an outlet externally threaded portion placed on said outlet end portion;

a flange placed adjacent said outlet externally threaded portion;

a contact shoulder placed against said flange, said contact shoulder having an outer diameter less than said flange;

a sealing washer placed adjacent said contact shoulder, said sealing washer having an opening with a diameter greater than the outer diameter of said contact shoulder; and a locknut threaded onto said outlet externally threaded portion, whereby said locknut forces said sealing washer against said flange and said contact shoulder prevents excess force being applied to said sealing washier providing a seal, whereby a push-in unidirectional locking arrangement for securing an electrical metallic tube is formed so that the electrical metallic tube can be securely held yet rendered readily removable.

* * * * *